May 19, 1959

G. W. DEXTER ET AL 2,887,684

DIELECTRIC LENS FOR CONICAL SCANNING

Filed Feb. 1, 1954

INVENTORS.
GEORGE W. DEXTER,
GIUSTO FONDA-BONARDI,
BY Nicholas T Vohr

THEIR ATTORNEY.

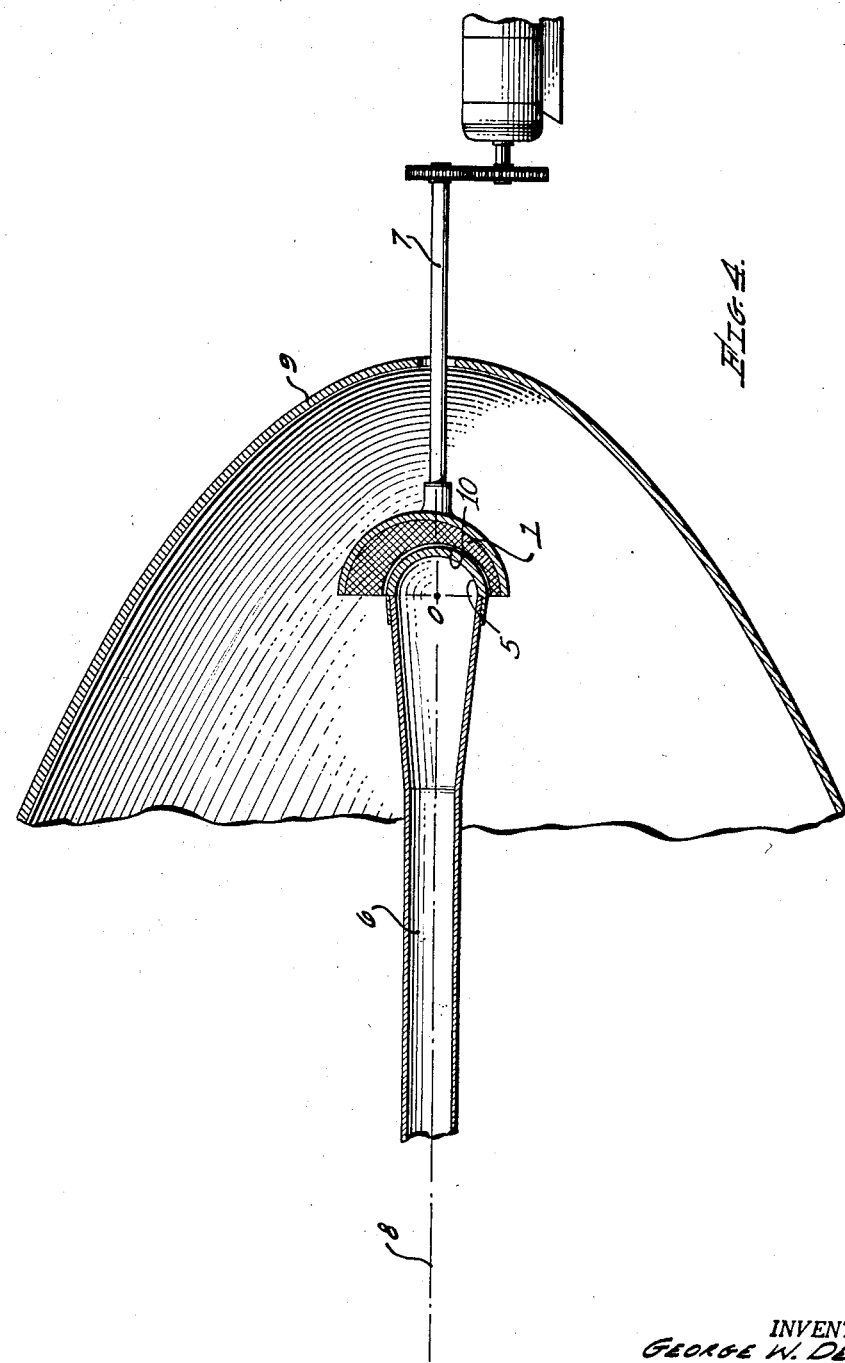

United States Patent Office 2,887,684
Patented May 19, 1959

2,887,684
DIELECTRIC LENS FOR CONICAL SCANNING

George W. Dexter, Los Angeles, and Giusto Fonda-Bonardi, Long Beach, Calif., assignors to Hughes Aircraft Company, Culver City, Calif., a corporation of Delaware Application February 1, 1954, Serial No. 407,246

1 Claim. (Cl. 343—781)

This invention relates to directive antenna systems and particularly to conical scanning microwave radar antennas.

In radar systems that are used for automatically tracking a target, a near cylindrical beam of microwaves referred to as the radar beam is sent out and the direction of this beam is moved through a cone with a constant angular velocity. The motion of the radar beam is referred to as conical scanning and the solid angle generated by this motion is the scan angle.

The reflection or echo of such a radar beam from a target is modulated by virtue of the directive properties of the beam to an extent that depends on the deviation of the scan axis from the direction of the target. Details of the principles of conical scannnig as applied to radar sets can be obtained in any modern treatise on radar.

One method of conically scanning a radar beam is accomplished by placing a source of radiation on the axis of symmetry and tilting the axis of a rotating reflector either about the focal point of the reflector by an amount equal to the scan angle or about the vertex of the reflector by an amount equal to half the scan angle. The axis of rotation always coincides with the axis of symmetry. This method is practical at low scan rates, but becomes impractical at very high scan rates, due to dynamic unbalances of the reflector.

Another method of conically scanning a radar beam is to leave the reflector stationary and to move the radiator through a circular path in a plane passing through the focal point of the reflector and being perpendicular to the axis of the reflector. While this method has been used successfully at low scan speeds, it was found that at high scan speeds, major mechanical problems made this method impractical.

A third method of conically scanning a radar beam has been suggested in the prior art. This method is the rotation of a dielectric lens placed in the path of radiation between the source and the reflector. A stationary radiator is placed on the reflector axis and a rotating dielectric lens is interposed between the radiator and the reflector. The function of the dielectric lens is to produce an image of the radiator in a plane passing through the focal point of the reflector and perpendicular to the axis of the reflector. This dielectric lens is mechanically rotated about the axis of the reflector. The result is a rotation of the virtual image of the source in a small circular path, producing the effect of the rotating radiator mentioned in the second method described above. The shape of the surfaces comprising the dielectric lens is determined by the theory of the Cartesian ovals. Such a lens gives a perfect image for only one point at one distance. Producing conical scanning of a radar beam by means of such a dielectric lens has been found impractical until now, because of the extremely low transmission efficiency of such a lens, due to the large amount of electromagnetic radiation which is reflected at the inner and outer surfaces of the dielectric lens. Also, the use of dielectric lenses, in conjunction with waveguides acting as electromagnetic sources, causes attenuation by a serious impedance mismatch which further reduces the efficiency of such a system. Furthermore, the configuration of the boundaries of dielectric lenses suggested in the prior art are complicated, making their production difficult.

It is one object of the invention to provide improvements in conical scanning systems of the type using a dielectric lens, to increase the efficiency of the system to a point where the transmission losses, due to the introductions of such dielectric lenses, become negligible for all practical considerations.

It is another object of this invention to provide non-reflective coatings on dielectric lenses used for conical scanning systems to eliminate reflections from the outer and inner dielectric lens surfaces.

It is another object of this invention to approximate the optimum theoretical configuration of the two surfaces of the dielectric lens, in the conical scanning system using a dielectric lens, by lens surfaces which are spherical in form.

More specifically, a further object of this invention is to provide a dielectric lens for conical scanning systems whose boundaries consist of two hemispheres lying on the same side of the same plane with their centers displaced laterally by an amount determined by the desired scan angle.

It is another object of this invention to provide an impedance matching termination for the electromagnetic source of radiation in the conical scanning system using a dielectric lens, which also serves as a pressure seal for the open ended radiating waveguide.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 4 shows a dielectric lens with a single quarter-wave matching layer cemented to it, and an arrangement wherein the second matching layer is used as a pressure seal for a horn feed cooperating with the lens, and a parabolic reflector to provide focusing.

It is known that a point source of radiation, when placed at the focal point of a parabolic reflector, will give rise to a reflected beam of radiation which is cylindrical in shape and which is parallel to the axis of the reflector. It is also known that if the point source is moved a small distance away from the axis of the reflector in a plane which passes through the focal point or very near to it and which is perpendicular to the reflector axis, and if this distance is substantially smaller than the focal length of the reflector, the reflected beam is still very nearly cylindrical, but now the direction of this beam is inclined to the axis of the reflector by an angle $\theta$. In conically scanning a radar beam this angle $\theta$ is usually referred to as the scan angle. In the above geometry the scan angle $\theta$ is given by the relation:

(1) $\quad \theta = \tan^{-1}\dfrac{d}{f}$ degrees where $f$ is the focal length of the reflector and $d$ is the lateral distance between the point source of radiation and the focal point of the reflector.

Figure 1:
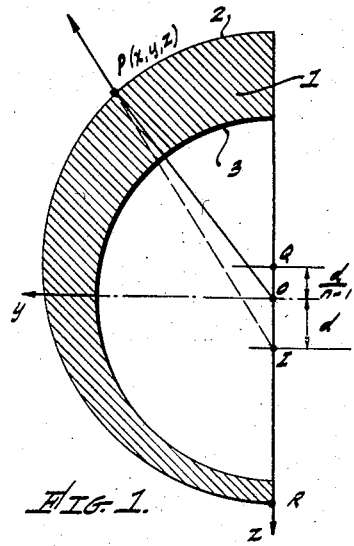
Fig. 1 shows a cross-sectional side view of the dielectric lens used in this invention.

Shown in Fig. 1 is a cross-sectional view of a dielectric lens 1 which is bounded by an outer surface 2 and an inner surface 3. The dielectric material of the lens 1 has an index of refraction $n$ greater than that of free space. Fig. 1 also shows the coordinate system with reference to the lens geometry. Reference character O denotes the position of a point source radiator which coincides with the origin of the coordinate system. Reference character I denotes the position of the image of O, also referred to as a virtual source. The distance between O and I is the distance $d$ defined in Equation 1 along the positive $z$ axis. The magnitude of $d$ is chosen so that the scan angle given by Equation 1 has the desired value $\theta$.

The theory on which the principle of application of the dielectric lens is based is as follows: a source is placed at O, which in combination with a parabolic reflector, not shown in Fig. 1, whose focal point coincides with position O, would result in a cylindrical beam of radiation which is parallel to the axis of the reflector. It is desired, however, to obtain a cylindrical beam of radiation whose direction makes an angle $\theta$ with the axis of the reflector, and which can be rotated around the reflector axis. One way of accomplishing this is to make the reflector see an image of the point source at O which is rotating in a small circle concentric with the reflector axis and in a plane perpendicular to the reflector axis, and intersecting it near or at the focal point.

The point source located at O sends out a radar beam which is refracted at the lens surface 2. Looking through the lens from its convex side as the reflector does, the source of this radar beam appears to be situated at I. In the following derivation of the lens surface, the radiator is assumed at the origin of the coordinate system. In principle, this is not necessary at all. In fact, the radiator can be anywhere along the reflector axis and the desired equation of the surface can be found in the same manner as outlined below by substituting for $z$ the term $z-a$, where $a$ is the distance between O and the radiator measured along the positive $z$ axis. Applying the theory of Cartesian ovals, the general equation of the wave front $\psi_0$ on the concave side of lens surface 2 due to the point source at O, is:

$$\psi_0 = \sqrt{x^2+y^2+z^2}$$

and the general equation of the wave front $\psi I$ on the convex side of the lens surface 2, seemingly, due to the image source situated at I is:

$$\psi I = n\sqrt{x^2+y^2+(z-d)^2}$$

Since these two wave fronts must be equal to one another at the lens surface 2, this boundary condition results in the general equation of a surface separating two media of different refraction indices, namely, the equation of the Cartesian oval:

(2) $\quad \sqrt{x^2+y^2+z^2} = n\sqrt{x^2+y^2+(z-d)^2}$

Figure 2:
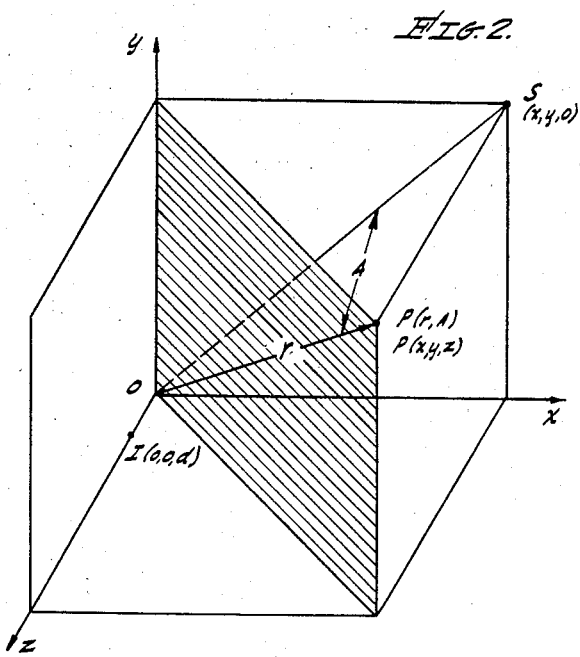
Fig. 2 shows two superimposed coordinate systems which are used to derive some of the mathematical relations pertaining to this invention.

Equation 2 shows that the lens surface 2 given by the expression is a surface of revolution about the $z$ axis. Such symmetry suggests the employment of a new coordinate system shown in Fig. 2. Changing the variables $x$, $y$ and $z$ to $r$, and an angle $A$, where $r$ is the distance to any point P on the lens surface 2 from the point O, and $A$ is the angle that a line from O to the point P makes with the $x-y$ plane, as shown in Fig. 2, Equation 2 can now be written as:

(3) $\quad r = R + \dfrac{1-\sin A}{n-1}d + \dfrac{\cos^2 A}{2R(n-1)}d^2 + \cdots$ where the arbitrary constant R is the value of $r$ at the angle $$A = \dfrac{\pi}{2}$$

radians which is the same as the intersection of this surface with the positive $z$ axis as shown in Fig. 1. Since $$\dfrac{d}{R} \ll 1$$

terms beyond the second in the above series can be neglected.

The surface given by Equation 3 was derived on the principle that the dielectric material extended far enough to the right of lens surface 2 to include the points O and I, Fig. 1. However, since a point source is considered, which radiates spherically, it is possible to provide an inner surface to the lens concentric with O without affecting the position of the image I, Fig. 1. This is true because radiation in all directions will undergo exactly the same change of phase travelling to and through such an equidistant surface. For this reason, the inner lens surface 1 can be chosen of any radius, the maximum value of which is determined by the minimum wall thickness desired. Therefore, since R is the minimum value of $r$, the maximum radius of the inner lens surface 3 is equal to R minus the desired minimum wall thickness.

On theoretical consideration, there is no reason for putting the concentric lens surface 3 on the concave side of lens surface 2. It is quite feasible to have the concentric surface on the convex side of lens surface 2. This second embodiment of the dielectric lens will result in a much larger physical structure since $$\dfrac{d}{r}$$

should be much smaller than unity, which will defeat some of the advantages of the first embodiment.

The Equation 3 defines the true surface of the Cartesian oval. Since it is somewhat difficult to manufacture the exact surface defined by this equation, the following approximation is made. Choose a point Q along the negative $z$ axis, a distance $$\dfrac{d}{n-1}$$

from O, Fig. 1. Using Q, Fig. 1 as a center and $$R + \dfrac{d}{n-1}$$

as a radius, a new, very much simplified surface is obtained whose equation, referred to O, Fig. 2, is given by:

(4) $\quad r = R + \dfrac{1-\sin A}{n-1}d - \dfrac{\cos^2 A}{2R(n-1)^2}d^2 + \cdots$ Since as before $$\dfrac{d}{R} \ll 1$$

terms greater than the second in this series, are negligible.

Comparing Equations 3 and 4, it is immediately seen that to a very good approximation, the two surfaces so defined are identical. Since the surface is a surface of revolution about the $z$ axis, as discussed before, the dielectric lens 1, shown in Fig. 1, can now be said to be formed of two hemispherical surfaces lying on the same side of the same plane with their centers laterally displaced by the distance OQ, Fig. 1, which is $$\frac{d}{n-1}$$

a distance which is determined by the scan angle desired, i.e., using Equation 1, $$OQ = f \frac{\tan \theta}{n-1}$$

The radii of the two surfaces can be of any convenient magnitude subject to the conditions that $R \gg d$, and the inner surface should be small enough to provide reasonable wall thickness to the dielectric lens 1.

Figure 3:
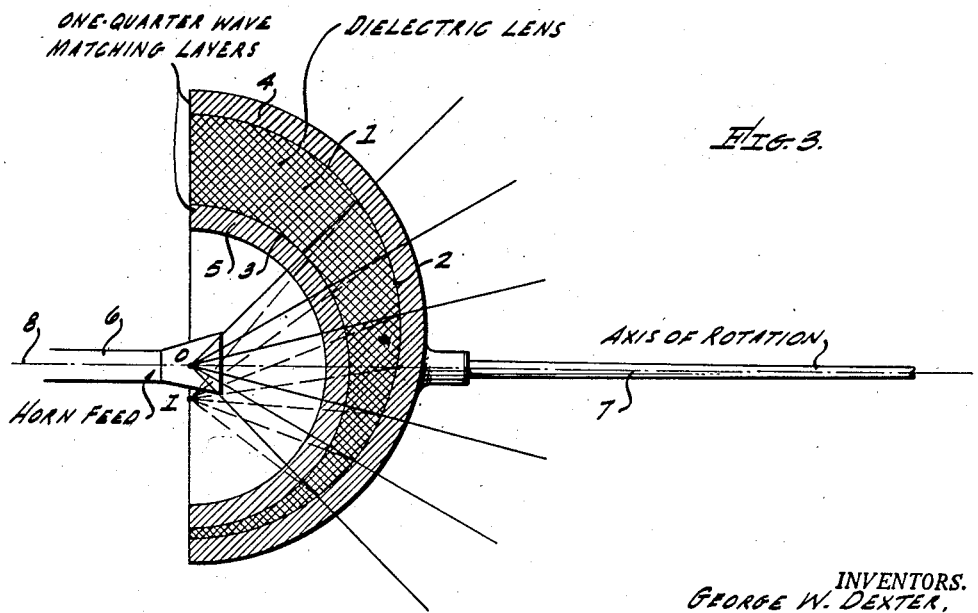
Fig. 3 shows a dielectric lens to which two quarter-wave matching layers are cemented. It also shows one particular arrangement of the radar source and the dielectric lens described in this invention.

Referring to Fig. 3, the dielectric lens 1 has cemented to it two one-quarter wave matching layers 4 and 5. Without these layers, the radar beam from O, Fig. 3, would be partially reflected at lens surfaces 2 and 3. These reflections give rise to a serious enough reduction of the amount of radiation transmitted (apart from other considerations not mentioned here), to make the dielectric lens impracticable. However, the addition of the matching layers 4 and 5 reduces the above-mentioned reflections to practically zero, thereby allowing all the radiation from the point O, which is incident on the reflector in the absence of the dielectric lens now, to be transmitted through the lens to the reflector. The theory whereby matching layers accompany this annulment of reflections can be found in text books on electromagnet theory. It is based on the principle of destrictive interference of the reflected portions of the electromagnetic wave at normal incidence from the two surfaces of a plane sheet which has a thickness equal to one-quarter wavelength of the impinging radiation. In order that the magnitudes of the reflections from both surfaces of a plane sheet be of equal magnitude so that complete destructive interference may result, the index of refraction of this plane, or of the matching layers in this invention, must be equal to the geometric mean of the indices of refraction of the materials adjacent to both surfaces of the layer. In the case of the dielectric lens in this invention, since one adjacent material of the layer is air, the matching layer requires an index of refraction equal to the square root of the index of refraction of the dielectric lens itself.

Fig. 3 also shows one embodiment of this invention wherein an open-ended waveguide 6, used as a source and whose effective center of radiation is located at the position O, is placed on the concave side of the dielectric lens 1 to which are cemented the two matching layers 4 and 5. A shaft 7 is rigidly connected to the lens or attached to the outer matching layer 4 as shown. The shaft 7 passes also to a mechanism for rotating the shaft and lens combination about the center line of the conical scanning system 8. A parabolic reflector 9, not shown in this figure but indicated in Fig. 4, is placed so that its concave side faces a convex side of the dielectric lens, its focal point coinciding with the position of O and containing an opening in its center to allow passage to the shaft 7. The rotating mechanism for the shaft is placed behind the convex side of the reflector.

Fig. 4 shows a different embodiment of this invention wherein an open-ended waveguide 6 is hermetically sealed by a hemispherical cap 5. This hemispherical cap takes the place of the inner matching layer of the dielectric lens 1. A small air space 10 shown in Fig. 4 is created by the necessary separation between the inner matching layer 5, which is now stationary, and the dielectric lens 1 which has to rotate. This air gap is of little consequence as long as the radial length of the air space is very much less than one-quarter wavelength of the radiation which it passes. Also shown is the position of the stationary parabolic reflector 9 in relation to the dielectric lens 1 and the position of the open-ended waveguide 6. The axis of the reflector 8 coincides with the axis of rotation 7. The open-ended waveguide 6 receives the radar waves in a manner convenient to the design. The shaft of rotation 7 passes through the reflector 9, and terminates in the above-mentioned rotating mechanism.

The embodiments described above employ open-ended waveguides as sources of radar energy. However, the open-ended waveguides may be replaced by dipoles without requiring any other modification to the systems shown. The only restriction on the substitution of different types of radiators is that the position of the effective center of radiation remains unchanged.

What is claimed is:

A conically scanning antenna system comprising: a radiation horn having a throat and a mouth, and defining a point source of radiation therebetween; wavequide feed means coupled to the throat of said horn; a concave reflector having a reflector axis facing the mouth of said horn and supported such that its focal point substantially coincides with said point source; a lens of dielectric material including an inner concave hemispherical surface and an outer convex hemispherical surface lying on the same side of a common plane containing both centers of curvature; shaft means coupled to said lens and rotatably supporting said lens between said horn and said reflector, said shaft means and said waveguide feed means extending in opposite directions along said reflector axis, said inner concave hemispherical surface facing the mouth of said horn and having its center of curvature located on said reflector axis, the center of curvature of said outer surface being laterally displaced from the center of curvature of said inner surface by an amount substantially equal to $$\frac{f \tan \theta}{n-1}$$

where $f$ is the focal length of said reflector, $\theta$ is the scan angle, and $n$ is the refractive index of said dielectric lens; and a first and a second hemispherical shell, each having a uniform thickness substantially equal to one-quarter of a working wavelength and each having a dielectric constant substantially equal to the square root of $n$, the refractive index of said dielectric lens, said first shell hermetically sealing the mouth of said horn and separated from said inner concave hemispherical shell by a small air space, said second shell being cemented to said outer convex surface.

References Cited in the file of this patent

UNITED STATES PATENTS

| 2,422,579 | McClellan | June 17, 1947 |
| 2,571,129 | Hansen | Oct. 16, 1951 |
| 2,689,304 | Lawrence | Sept. 14, 1954 |

FOREIGN PATENTS

| 130,548 | Australia | Dec. 23, 1948 |

OTHER REFERENCES

"Microwave Antenna Theory and Design," Radiation Laboratory Series 12, McGraw-Hill, 1949, pp. 401–402.

UNITED STATES PATENT OFFICE

Certificate of Correction

May 19, 1959

Patent No. 2,887,684

George W. Dexter et al.

It is hereby certified that error appears in the printed specification of the above numbered patent requiring correction and that the said Letters Patent should read as corrected below.

Column 4, lines 3 to 5, the equation should appear as shown below instead of as in the patent:

$$r = R + \frac{1-\sin A}{n-1} d + \frac{\cos^2 A}{2R(n-1)} d^2 + \ldots$$

column 5, line 29, for "electromagnet" read —electromagnetic—.

Signed and sealed this 20th day of October 1959.

[SEAL]

Attest:
KARL H. AXLINE,
*Attesting Officer.*

ROBERT C. WATSON,
*Commissioner of Patents.*